(12) United States Patent
Ford (10) Patent No.: US 7,533,368 B1
(45) Date of Patent: May 12, 2009

(54) USER INTERFACE DRIVEN BY DYNAMIC STATE CHANGES

(75) Inventor: Bradley D. Ford, San Jose, CA (US)

(73) Assignee: Apple Inc., Cupertino, CA (US)

( * ) Notice: Subject to any disclaimer, the term of this patent is extended or adjusted under 35 U.S.C. 154(b) by 703 days.

(21) Appl. No.: 11/158,732

(22) Filed: Jun. 21, 2005

(51) Int. Cl.
 *G06F 9/44* (2006.01)
 *G06F 17/00* (2006.01)

(52) U.S. Cl. .............. 717/113; 717/105; 717/106; 717/107; 707/103 R; 707/102; 707/100

(58) Field of Classification Search ............. 717/105, 717/106, 107, 108, 109, 111, 113, 116; 707/103 R, 707/100, 204, 102, 205
 See application file for complete search history.

(56) References Cited

U.S. PATENT DOCUMENTS

| | | | | |
|---|---|---|---|---|
| 5,822,587 | A * | 10/1998 | McDonald et al. | 717/108 |
| 6,304,879 | B1 * | 10/2001 | Sobeski et al. | 707/103 R |
| 6,754,668 | B2 * | 6/2004 | Noble et al. | 707/102 |
| 7,171,648 | B1 * | 1/2007 | Finocchio | 717/110 |
| 2004/0221267 | A1 * | 11/2004 | Chase et al. | 717/121 |
| 2006/0031856 | A1 * | 2/2006 | Hasha et al. | 719/330 |
| 2006/0230386 | A1 * | 10/2006 | Olsen | 717/127 |
| 2007/0261025 | A1 * | 11/2007 | Seto et al. | 717/108 |

OTHER PUBLICATIONS

Analysing dynamic change in distributed software architectures, Kramer, J. Magee, J., IEEE, 1998, vol. 145, Issue: 5, pp. 146-154.*
A formal framework for on-line software version change, Gupta, D. Jalote, P. Barua, G., 1996, IEEE, vol. 22, Issue: 2, pp. 120-131.*
An event-driven test framework for evolutionary algorithms in dynamic environments, Sima Etaner-Uyar, A.; Turgut Uyar, H.; IEEE, vol. 2, Jun. 19-23, 2004, pp. 2265-2272.*
Dependability of complex software systems with component upgrading, Li, J.J.; Mulcare, D.B.; Wong, W.E.; IEEE, Oct. 25-27, 2000 pp. 413-418.*
Apple Computer, Inc. "Core Audio," Apple Computer Preliminary Document, Mar. 25, 2004, pp. 1-154.
Apple Computer Inc., "Component Manager Reference," Apple Computer, Inc, Feb. 14, 2003, pp. 1-83.

* cited by examiner

*Primary Examiner*—Wei Y Zhen
*Assistant Examiner*—Satish Rampuria
(74) *Attorney, Agent, or Firm*—Hickman Palermo Truong & Becker LLP (57) ABSTRACT

A method for responding to changes to properties of component instances is disclosed. A routine, that is to be informed of changes that occur to a particular property of a plurality of properties of a component instance, is registered. The value of the particular property is detected as changed when the value of the particular property changes because of a change to another property of the plurality of properties. A call is made to the routine to indicate that the particular property has changed.

32 Claims, 3 Drawing Sheets

USER INTERFACE DRIVEN BY DYNAMIC STATE CHANGES

FIELD OF THE INVENTION

The present invention relates to managing components and, more specifically, to responding to changes made to properties of component instances.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A component is a module of code for performing one or more tasks within a software application or service. The task performed by a component may involve generating a user interface, or may involve operations, such as playing a sound or a movie, that do not involve the generation of a user interface. Typically, components have several properties. For example, an audio format configuration component may have a sampling rate property, an encoding scheme property, etc.

Some operating systems may include a facility, referred to herein as a component manager, that discovers installed components. When there is a need for a particular type or subtype of a component, the component manager may search for and provide a list of all installed discovered components of the designated type or subtype.

An instance of a component is referred to herein as a "component instance". Component instances have the properties of the component of which they are an instance. Thus, an instance of the audio format configuration component described above would have a sampling rate property and encoding scheme property. In addition, component instances typically have specific values assigned to those properties. For example, an audio format configuration component instance could have a sampling rate of 44.1 kHz, and an encoding scheme of MP3.

The interrelationships between the properties of a component may be complex. Components typically implement logic that constitutes a state machine for making the changes necessitated by the interrelationships. For example, in response to changing the value of one property of a component instance, the state machine of the component instance may cause the values of one or more interrelated properties of the component instance to change. The changes to the values of the interrelated properties may then cause even more property values to change. Thus, a single change to the value of a single property of a component instance may set off a chain reaction in which the values of any number of properties are changed.

Certain software modules may be interested in the values of properties of a component instance. Such modules are referred to herein as "interested modules". The specific properties in which an interested module has an interest are referred to herein as "properties of interest".

Interested modules themselves may or may not be components. For example, an interested module may be a User Interface (UI) module that displays the values of some or all of the properties of a component instance. In this example, the properties of interest would be the properties whose values are displayed by the UI. The UI module needs to know the current values of the properties of interest, so that the values that are displayed in the UI are kept current.

To ensure that the values displayed in the UI are kept current, the UI module may be designed with logic to know the circumstances under which the values for those properties will change. Thus, a developer who tries to implement a custom UI for a particular component needs to be aware of which values of which properties of the component instance trigger changes to which other properties of the component instance. Furthermore, the developer needs to be aware whether any properties that are changed as a result of changes to other properties are relevant to the properties that need to be included in the custom UI. This problem has a particular significance for implementations that need to rely on existing components, which are very complex and which include many properties and routines. Given the potential complexity of components, it may not be practical for interested modules to include such logic.

For example, a standard audio format configuration component may be used for encoding, decoding, or transcoding from one audio format (such as, for example, a file, a live input, or a network feed) to another format (which can be saved to a file or streamed out for a live broadcast and never saved to disk). Such encoding, decoding, or transcoding operations are very complex, as the properties of the starting audio format and the capabilities of the destination audio format can restrict one another. In this example, if a developer tries to implement a custom UI by using the standard audio configuration component, the developer needs to know and account for all the intricate property interrelatioships associated with the various audio encoding schemes. Furthermore, given the complexities of the standard audio format configuration component, it may not be practical for the custom UI to include logic that accounts for the circumstances under which the values for the different properties associated with the various audio encoding schemes change.

As an alternative, the interested module may be designed to periodically poll the component instance, to determine the current values of the properties of interest. However, polling is also not practical, since frequent polling of rarely changed property values is wasteful, and infrequent polling of frequently changed property values results in inaccuracies. Specifically, in order to determine whether a particular property of a component instance has changed, the property must be polled even though an actual change to the property may not have occurred. For example, if the value of another property, which may trigger a change to the particular property, is such that an actual change to the particular property has not occurred, the particular property must still be polled, which results in wasting time and computing resources.

Based on the foregoing, there is a clear need for a mechanism that allows interested modules to keep track of the current values of properties of interest without the overhead of polling, and without the need to understand the potentially complex interrelationships between component properties.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

As mentioned above, an interested module is a module that is interested in the current values of one or more properties of a component instance. Interested modules are typically implemented as one or more routines. According to an embodiment of the invention, interested modules are designed with one or more routines for receiving notifications of changes that occur to values of properties of interest. A routine, within an interested module, that is responsible for receiving notifications of changes in the value of a property of interest is referred to herein as an "interested routine".

Techniques shall be described hereafter for providing notifications to the interested routines, so that interested modules neither have to poll the component instances, nor incorporate logic to deal with the complex interrelationships of component properties. According to one embodiment of the invention, an interested module registers interested routines with a component instance. In the registration, the interested module identifies (1) a particular property of the component instance, and (2) the interested routine that is to be informed of changes to the value of the particular property. When the value of the particular property changes (e.g. because of a change to another property of the plurality of properties), the change of the value of the particular property is detected. A call to the interested routine is then made to indicate that the value of the particular property has changed.

According to one embodiment of the invention, the interested routine is associated with a user interface (UI), where the user interface reflects the values of one or more properties of the component instance. The notification, which indicates that a particular property has changed, is sent to the interested routine of the UI. The notification is received at the UI, and the UI is updated to reflect the changed value of the particular property.

For example, after a user clicks on or otherwise selects a new value of a property in the UI, the UI sends a request to the state machine of the UI component to change the property, and then waits to get notified about changes to this and any other property for which the UI has registered a routine. After receiving a notification that a change to this or another property has occurred, the UI reflects the changes of the properties displayed by the UI. Thus, the UI is dynamically informed about exactly which properties have changed, and may update only the UI display of the changed properties.

As mentioned above, the change to a property of interest may be the result of a change to another property of the same component instance. The change to the other property, which causes a change to the value of the particular property, may in fact be the first change in a series of recursive changes to two or more properties of the plurality of properties. A common routine for the two or more properties of interest may be registered, or separate routines may be registered for each property where each registered routine is to be informed of changes that occur to its respective property of interest. Calls to the routine or routines are then made only after all of the changes in the series of recursive changes have been made.

An Example of an Operational Context

Figure 1:
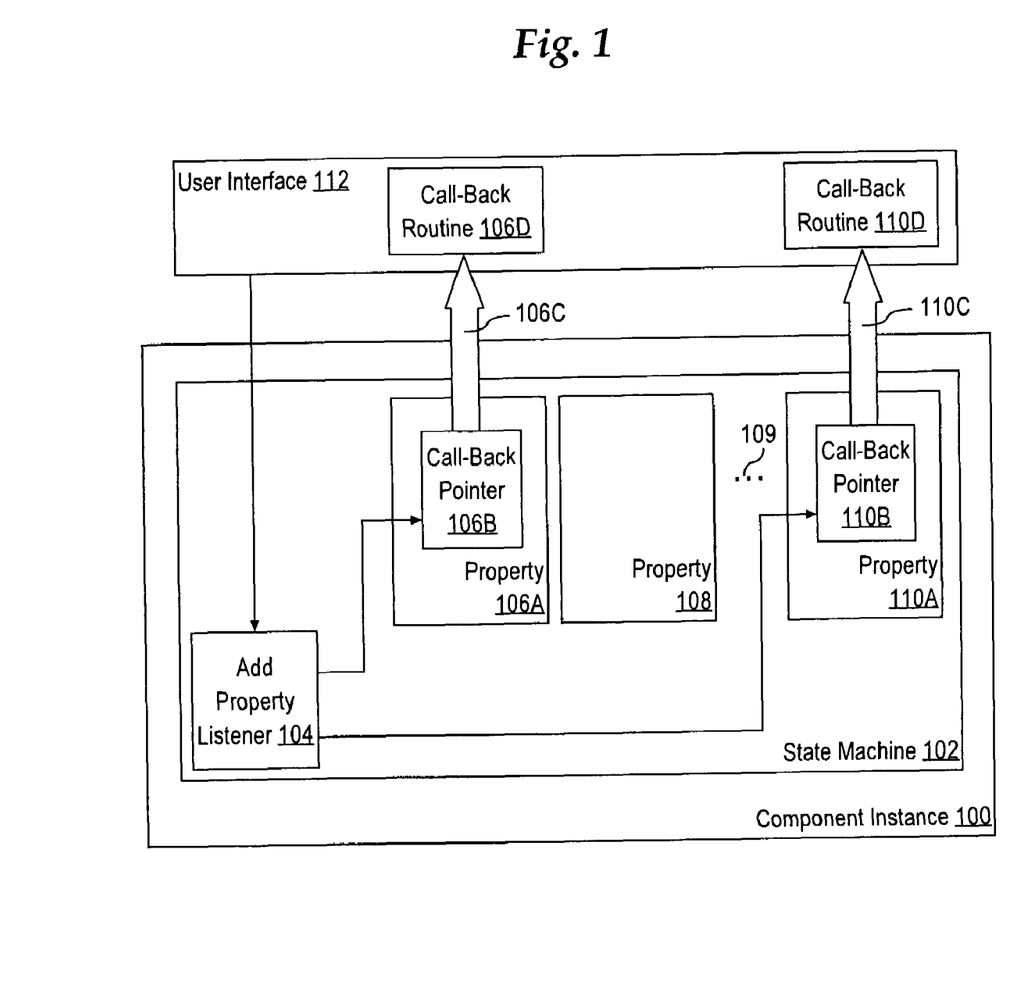
FIG. 1 is a block diagram illustrating an overview of an operational context according to one embodiment of the invention.

FIG. 1 is a block diagram illustrating an overview of an operational context according to one embodiment of the invention. FIG. 1 depicts component instance 100, and a user interface 112 that contains controls for displaying and setting the values of some of the properties of component instance 100. Thus, in the operation context displayed in FIG. 1, user interface 112 is an interested module relative to component instance 100.

Besides being separate from component instance 100, in a different operational context, user interface 112 may be operatively connected to component instance 100, and/or may be an integral part of the component instance 100. Furthermore, the techniques described herein are not limited to being used specifically by an interested module that is a user interface. Rather, any entity in a computer system, such as, for example, a device driver, a system service, a software application, and a computer system process, can be an interested module that makes use of the described techniques. Therefore, the operational context depicted in FIG. 1 is but one example, and FIG. 1 is to be regarded in an illustrative rather than restrictive sense.

Referring to FIG. 1, state machine 102 is executed or operated by component instance 100. State machine 102 includes add property listener function 104, which is used to register interested routines for one or more properties of component instance 100. As depicted in FIG. 1, the properties of component instance 100 include properties 106A, 108, and 110A. The ellipsis 109 indicates that component instance 100 may include one or more additional properties that are not depicted in the figure.

An interested routine, which is to be notified when a property changes, may be registered by add property listener function 104 for one or more of the properties of component instance 100. FIG. 1 depicts that callback routines 106D and 110D are registered for properties 106A and 110A, respectively, and that no callback routine is registered for property 108. Callback routines 106D and 110D are part of the interested module that generates and maintains user interface 112.

In operation, user interface 112 calls the add property listener function 104 to indicate that callback routines 106D and 110D need to be registered for properties 106A and 110A, respectively. Add property listener function 104 then registers callback pointers 106B and 110B with properties 106A and 110A, respectively. Callback pointers 106B and 110B are associated with callback routines 106D and 110D, respectively, and may be used to make calls to their associated routines.

When a change to property 106A is detected, state machine 102 makes a call 106C to callback routine 106D using callback pointer 106B. When callback routine 106D is called, it responds to the change. For example, callback routine 106D may make one or more changes in user interface 112 in order to reflect the change made to property 106A. Similarly, when a change to property 110A is detected, state machine 102 makes call 110C to callback routine 110D by using callback pointer 110B. When callback routine 110D is called, it makes one or more changes in user interface 112 in order to reflect the change made to property 110A.

Registering Callback Routines

Some or all of the components used in a computer system may share certain common component selectors, which enables a component manager to search for, and discover the components based on requests from users. With respect to component properties, different component implementations may provide different selectors for performing similar tasks, such as, for example, getting a property, retrieving the value of a property, retrieving information or metadata about the property, and setting a property.

In one embodiment of the invention, a pair of functions is provided for registering and deregistering, with a component instance, one or more callback routines that are to be informed when changes to one or more corresponding properties occur. In this embodiment, the pair of functions is implemented as a couple of selectors that are associated with a component.

For example, the selector for registering a routine as a property listener may be called "AddComponentPropertyListener", and the selector for deregistering a property listener may be called "RemoveComponentPropertyListener." When a routine needs to be registered as a callback routine that is to be informed when a particular property changes, a pointer to the routine is provided in a call that is made to "AddComponentPropertyListener." "AddComponentPropertyListener" then registers the pointer by associating the particular property with the pointer. When a routine needs to be de-registered as a callback routine, a call that is made to "RemoveComponentPropertyListener", and the pointer to the routine is disassociated with the particular property.

In one embodiment of the invention, in addition to a pointer to the callback routine, a function for registering routines may take as input parameters the component instance identifier of the component instance for which the routine is registered, an identifier of the property for which the routine is registered, and an identifier of the class of properties to which the property belongs. In some embodiments of the invention, the component instance may be instantiated from an object-oriented class, such as, for example, a C++ class, and there may be more than one component instance instantiated from the same object-oriented class. In these embodiments, the function for registering routines may also take as an input parameter a reference constant indicating the particular component instance of the object-oriented class which registers the callback routine. The reference constant is then provided when the callback routine is called in order to notify the particular component instance that registered the callback routine and not any other component instance that is instantiated from the same object-oriented class.

In one embodiment of the invention, a callback routine may be a routine that is to be informed when the value of a particular property changes. The change to the particular property may be caused by a change to another property of the component instance, or by any hardware or software event in the computer system, such as, for example, plugging a device in the computer system, unplugging a device from the computer system, failure of a service executing on the system, or receipt of a notification from another computer system.

When a callback routine is notified of a change to a particular property, the callback routine may perform a variety of actions including, but not limited to, reflecting the new value of the property in the entity that registered the routine, and/or performing a specific task that is related to the change of the property value. In some embodiments, the callback routine may receive from the component instance the new value or values of the property for which the routine is registered.

Different embodiments of the invention may utilize different techniques for associating callback routines with component instance properties. For example, a single routine may be used to perform the tasks of registering and deregistering a callback routine. In addition, some embodiments of the invention may use means different than pointers to associate a callback routine with a property, such as means to call a function by name instead of by reference. Also, in some embodiments add property listener functions may have different input and output function parameters. Furthermore, besides being implemented as selectors, the functions for registering callback routines may be implemented in a variety of ways including, but not limited to, as regular component routines, as system services, as dynamic link libraries, and as background processes such as daemons. Thus, the techniques described herein are not limited to any particular way of registering routines that are to be informed when a component instance property changes.

AN EXAMPLE EMBODIMENT OF THE INVENTION

One particular embodiment of the invention relates to developing custom user interfaces (UIs) for displaying the properties of audio component instances. Suppose, for example, that a custom UI for an audio format configuration component needs to be developed, which custom UI is designed to support some, but not all, of the properties of an audio format configuration component instance.

For example, the standard UI provided with the audio format configuration component may include a list box which provides a selection of different formats in which an audio file can be encoded, converted, or exported, such as Linear PCM (Predictive Coding Modified), A-Law 2:1, AMR Narrowband, AAC (Advanced Audio Coding), AppleLossless, IMA 4:1, MACE 3:1, MACE 6:1, MPEG 1 Layer 1, MPEG 1 Layer 2, MPEG 1 Layer 3, µ-Law 2:1, QDesign Music 2, and Qualcomm PureVoice formats. Since some of these formats have a number of common properties (for example, available sample rates, applicable sample rates, number of channels, mono, stereo, etc.), in the standard UI the values of all of these common properties are displayed for each format when that format is selected in the list box. Also, since some audio formats have properties that are specific to these given formats (for example, LPCM has the specific properties of sample size, endian notation, and data type of audio samples, such as signed or unsigned integer or floating-point), in the standard UI the values of these specific properties are displayed only when the given formats are selected in the format list box.

Suppose, however, that the custom UI to the audio format configuration component does not need to deal with the complexity associated with each audio format, and needs to show only some specific properties of the available formats. For example, suppose that the users of the custom UI are interested in seeing only the available sample rate property for the audio format that is selected in a format list box of the custom UI.

In one embodiment of the invention, in order to provide support for a custom UI that meets the above criteria, an add property listener function is included in the audio format configuration component. When a component instance of the audio format configuration component is instantiated for the custom UI, the custom UI executes the add property listener function and registers with the component instance a callback routine for the format property of the instance. Thereafter, whenever a user changes the format selected in the custom UI, the custom UI is notified through the callback routine when the available sample rates for the selected format need to be changed.

For example, in a list box of the custom UI a user may change the audio format from LPCM to AAC. The custom UI is notified that the available sample rates displayed for the newly selected AAC format need to be changed. The custom UI then retrieves only the values associated with the available sample rate property from the audio format configuration component, and the user is presented with these available sample rates through the custom UI.

In this way, the custom UI does not need to poll the standard audio format configuration component instance to get the available sample rate values for the format selected by the user. Instead, based on the notification sent from the audio format configuration component instance, the custom UI knows that the displayed available sample rate values need to be changed according to the newly selected format. The custom UI then retrieves the new available sample rate values in the sample rate box displayed by the UI. Thus, not every property of the audio format configuration component instance that is displayed for the user through the custom UI needs to be changed, and the updates of the custom UI display are limited only to properties that have actually changed. Furthermore, the techniques described herein allow the developers of the custom UI to avoid the complexities involved in knowing, maintaining, and accounting for every property of every audio format that is supported by the audio format configuration component.

Sending Coalesced Notifications

In some situations, it is desirable to avoid informing callback routines of component instance property changes immediately after a change occurs. For example, a UI for an audio format configuration component instance may display a number of properties in a number of list boxes. Suppose, for example, that a user decides to change the audio encoder currently displayed in the UI, and selects a new encoder from the audio encoding list box. The change of the encoder in the UI then causes a number of changes to other properties of the component instance, such as, for example, available sample rates, applicable sample rates, and available and applicable channel layouts (for example, mono, stereo, 5.1, etc). Furthermore, some of the other properties may be changed more than once during the cascade of changes caused by the change to the encoder in the UI. In this situation, if a callback routine is registered to be informed when a change to a particular property has occurred, and if the particular property changes more than once, the callback routine will correspondingly be called more than once resulting in the UI doing twice as much work as it needed to in order to produce the correct final result.

In order to avoid this situation, in one embodiment all the changes to properties caused by a change to another property are made in a series of recursive calls to a "set property value" procedure. Whenever a recursive call in the series is made to set the value of any particular property, a counter is incremented. Whenever a recursive call to the set property value procedure returns, the counter is decremented.

If there is a callback routine registered for the particular property that is changed in a particular recursive call, a record is made of this fact but the call back routine is not called. A call to the callback routine for the particular property is made only when the counter is back at zero, e.g. when the set property value procedure has returned from the top-level recursive call. Thus, any callback routine that needs to be informed of any change made during a recursive chain of changes is called only when the all of the changes in the chain have been completed. Moreover, the callback routine for a particular property is called only once, despite the fact that more than one change to the value of the property may have been made during the cascade of changes. In other words, a double notification for changes to the same property is not sent back to the UI.

In one embodiment, a callback routine registered for a particular property is typically provided with only the last changed value for the property. In this way, it is unnecessary for the UI, with which the callback routine may be associated, to reflect all intermediate changes to the value of the property. In other embodiments, however, the callback routine may be called only once, but the notification may include the values of all changes made to the particular property.

Figure 2:
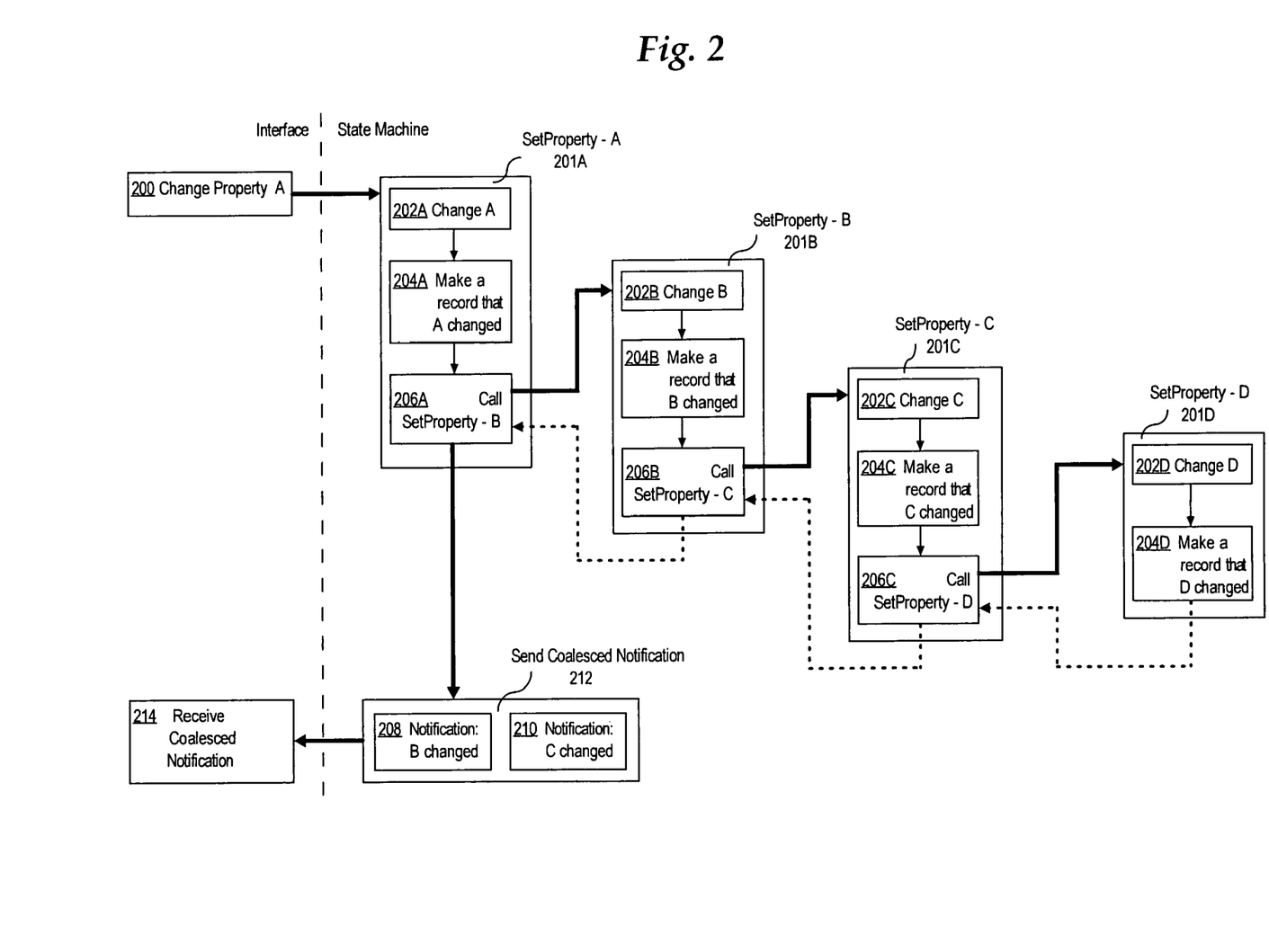
FIG. 2 is a flow diagram illustrating a method for coalescing notifications in response to changes of the values of component instance properties according to one embodiment of the invention.

FIG. 2 is a flow diagram that illustrates one technique for coalescing notifications in response to changes of the values of component instance properties according to an embodiment of the invention. FIG. 2 is based on a situation where a change to property A of a component instance causes a change to be made to the value of property B. The change to property B causes a change to be made to the value of property C, and the change to property C causes a change to be made to the value of property D. Further, callback routines are registered for properties B and C for the purpose of receiving notifications when properties B and C of the component instance have changed. In the example illustrated in FIG. 2, callback routines are not registered for properties A and D.

The value of property A is changed in a user interface of a component instance. In step 200, the change to the value of property A in the component instance is effected by making a call to a set property value procedure, e.g. SetProperty, which executes in a state machine of the component instance.

In step 201A procedure SetProperty is executed, and in step 202A the value of property A is changed in the component instance. In step 204A a record is made to indicate that the value of property A has changed. A recursive call is made to procedure SetProperty to change the value of property B in step 206A.

In step 201B, procedure SetProperty is executed in order to change the value of property B. The value of property B is changed in step 202B, and in step 204B a record is made to indicate that the value of property B has changed. A recursive call to procedure SetProperty to change the value of property C is made in step 206B.

Procedure SetProperty is executed in step 201C, and the value of property C is changed in step 202C. In step 204C a record is made to indicate that the value of property C has changed. In step 206C a recursive call is made to procedure SetProperty to change the value of property D.

Procedure SetProperty is executed in step 201D, and the value of property D is changed in step 202D. In step 204D a record is made to indicate that the value of property D has changed. The execution of procedure SetProperty in step 201D is then completed, and execution control returns to step 206C from which the recursive call to change the value of property D was made.

When the call to procedure SetProperty in step 206C has returned, the execution of procedure SetProperty in step 201C is completed. Even though a callback routine is registered to be informed when property C has changed, the callback routine is not called because the recursive series of changes caused by the change to property A has not yet completed.

Execution control then returns to step 206B from which the recursive call to change the value of property C was made. When the recursive call to procedure SetProperty in step 206B has returned, the execution of procedure SetProperty in step 201B is completed. Even though a callback routine is registered to be informed when property B has changed, the callback routine for property B is not called because the recursive series of changes caused by the change to property A has not yet completed.

With the execution of procedure SetProperty in step 201B completed, execution control returns to step 206A from which the recursive call to change property B was made. At this point the execution of procedure SetProperty in step 201A is complete. Furthermore, the series of recursive changes to the values of properties caused by the change to property A is also completed.

Since the series of recursive changes to the component instance properties has completed, in step 212 a coalesced notification is sent to the interface of the component instance. The coalesced notification includes notification 208 which indicates that property B has changed, and notification 210 which indicates that property C has changed. In step 214, the coalesced notification is received at the interface of the component instance.

In one embodiment of the invention, notification 208 is sent as a result of the record being made in step 204B and, similarly, notification 210 is sent as a result of the record being made in step 204C. For example, making the record in any of the steps 204A, 204B, 204C and 204D may include appending the property identifier of the corresponding property that changed to an array managed by the state machine. When the top-level recursive call has returned to step 206A, the state machine iterates in an outer loop through this changed properties array, and then in an inner loop, iterates through an array of registered callback routines. If the state machine finds a callback routine for a property that has changed, the state machine invokes that callback routine. In the example illustrated in FIG. 2, since there are registered callback routines only for properties B and C, only the callback routines for properties B and C will be invoked when the state machine iterates through the changed properties array and the array of registered callback routines.

In the embodiment of the invention depicted in FIG. 2, step 212 is performed by making calls to the callback routines registered for properties B and C in a sequence that corresponds to the order in which changes were made to these properties. Thus, a call is made first to the callback routine registered for property B, and then a call is made to the callback routine registered for property C.

In a different embodiment, step 212 may be performed by making calls to the callback routines registered for properties B and C in a sequence that corresponds to the reversed order in which changes were made to these properties. In this embodiment, a call to the callback routine registered for property C is made first, followed by a call to the callback routine registered for property B.

Hardware Overview

Figure 3:
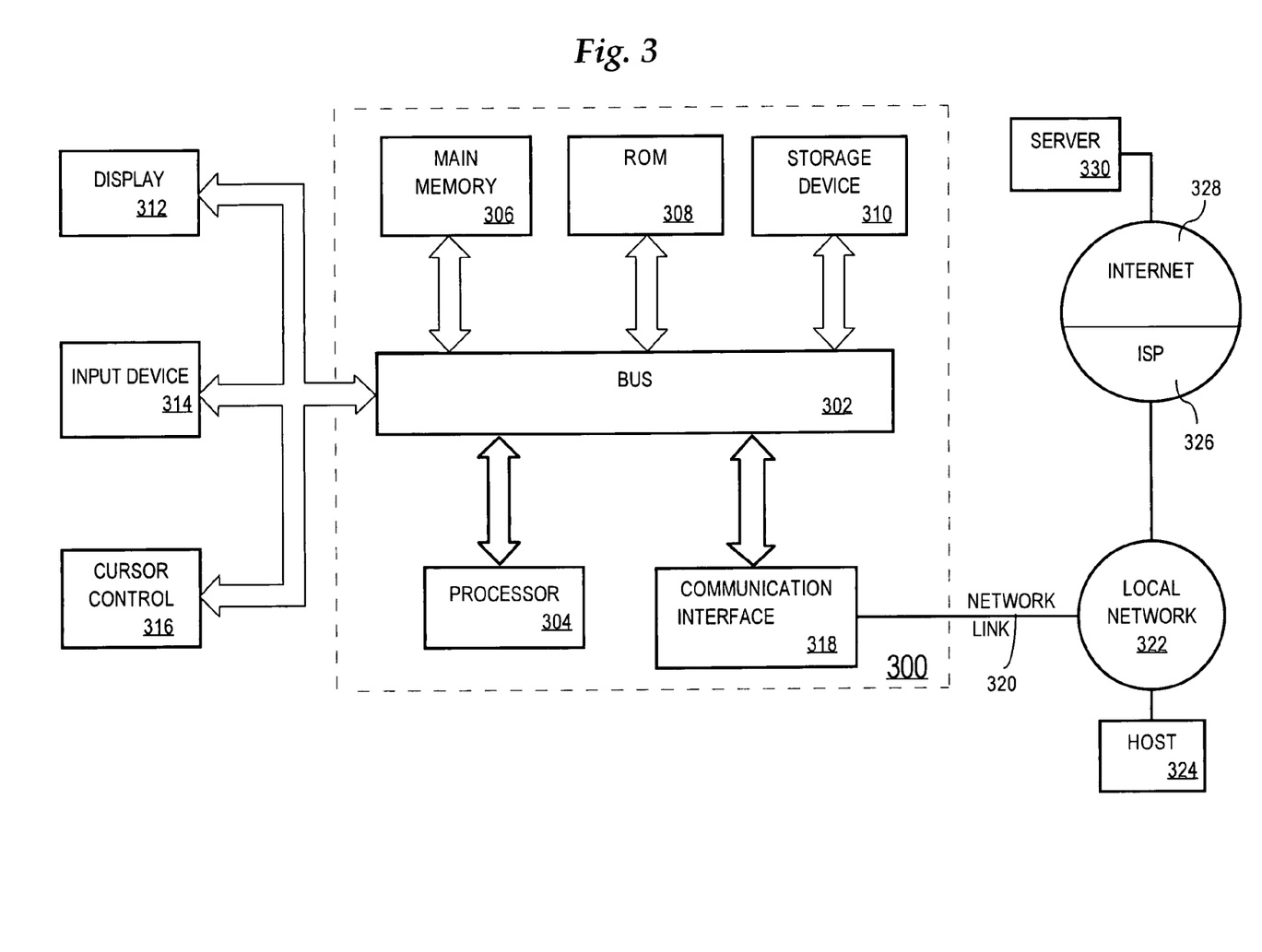
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for responding to changes to properties of component instances, the method comprising:
   instantiating a component instance of a component that has a plurality of properties and a function for registering routines to be informed when properties of the component change;
   receiving a first call that invokes the function of the component instance, wherein the first call specifies:
     (a) a particular property of the plurality of properties; and
     (b) a pointer to a routine that is to be informed when the particular property changes;
   in response to the first call, the function registering the routine that is to be informed of changes that occur to the particular property of the component instance;
   when the value of the particular property changes, detecting that the value of the particular property has changed; and
   in response to detecting that the value of the particular property has changed, using the pointer to make a second call, wherein the second call is to the routine and indicates to the routine that the particular property has changed.

2. The method of claim 1, wherein the change to the particular property is caused by a change to another property of the plurality of properties.

3. The method of claim 1, wherein using the pointer to make the second call further comprises sending a notification that the particular property has changed.

4. The method of claim 3, wherein:
   the routine is associated with a user interface, wherein the user interface reflects the values of one or more properties of the plurality of properties; and
   the notification is sent to the user interface.

5. The method of claim 1, wherein the routine is associated with one of a user interface, an application interface, a device interface, and a computer process interface.

6. The method of claim 1, wherein:
   the routine is associated with a user interface that reflects the value of the particular property; and
   the method further comprises:
     changing the value of another property of the plurality of properties through the user interface, wherein the other property is different than the particular property; and
     in response to changing the value of the other property, informing the user interface of the change of the value of the particular property, and changing the display of the user interface to reflect the change of the value of the particular property.

7. The method of claim 6, further comprising:
   in response to the second call, receiving, at the user interface, a notification that the value of the particular property has changed; and
   updating the user interface to reflect the changed value of the particular property.

8. The method of claim 1, wherein:
   the component is one of an audio component, a movie component, and a device component; and
   receiving the first call and registering the routine are performed as part of instantiating the component instance.

9. A computer-implemented method for responding to changes to properties of component instances, the method comprising:

registering a routine that is to be informed of changes that occur to a particular property of a plurality of properties of a component instance;

wherein the change to the particular property is caused by a change to another property of the plurality of properties;

wherein the change to the other property is a first change in a series of recursive changes to two or more properties of the plurality of properties, wherein the particular property is one of the two or more properties;

registering one or more routines that are to be informed of changes that occur to the two or more properties, wherein the routine is one of the one or more routines;

when the value of the particular property changes, detecting that the value of the particular property has changed; and making calls to the one or more routines only after all of the changes in the series of recursive changes have been made;

wherein making calls to the one or more routines comprises making a call to the routine to indicate that the particular property has changed.

10. The method of claim 9, further comprising keeping track of the order in which the two or more properties are changed in the series of recursive changes.

11. The method of claim 10, wherein the step of making calls to the one or more routines is performed in a sequence that corresponds to the order in which the two or more properties are changed.

12. The method of claim 10, wherein the step of making calls to the one or more routines is performed in a sequence that corresponds to the reversed order of the order in which the two or more properties are changed.

13. The method of claim 9, wherein:

at least one property of the two or more properties is changed twice in the series of recursive changes; and the step of making calls to the one or more routines comprises making a call only once to the one routine, of the one or more routines, that is registered for the at least one property.

14. A computer-readable volatile or non-volatile medium storing one or more sequences of instructions which, when executed by one or more processors, causes the one or more processors to perform the method recited in claim 1.

15. A computer-readable volatile or non-volatile medium storing one or more sequences of instructions which, when executed by one or more processors, causes the one or more processors to perform the method recited in claim 2.

16. A computer-readable volatile or non-volatile medium storing one or more sequences of instructions which, when executed by one or more processors, causes the one or more processors to perform the method recited in claim 3.

17. A computer-readable volatile or non-volatile medium storing one or more sequences of instructions which, when executed by one or more processors, causes the one or more processors to perform the method recited in claim 4.

18. A computer-readable volatile or non-volatile medium storing one or more sequences of instructions which, when executed by one or more processors, causes the one or more processors to perform the method recited in claim 5.

19. A computer-readable volatile or non-volatile medium storing one or more sequences of instructions which, when executed by one or more processors, causes the one or more processors to perform the method recited in claim 6.

20. A computer-readable volatile or non-volatile medium storing one or more sequences of instructions which, when executed by one or more processors, causes the one or more processors to perform the method recited in claim 7.

21. A computer-readable volatile or non-volatile medium storing one or more sequences of instructions which, when executed by one or more processors, causes the one or more processors to perform the method recited in claim 8.

22. A computer-readable volatile or non-volatile medium storing one or more sequences of instructions which, when executed by one or more processors, causes the one or more processors to perform the method recited in claim 9.

23. A computer-readable volatile or non-volatile medium storing one or more sequences of instructions which, when executed by one or more processors, causes the one or more processors to perform the method recited in claim 10.

24. A computer-readable volatile or non-volatile medium storing one or more sequences of instructions which, when executed by one or more processors, causes the one or more processors to perform the method recited in claim 11.

25. A computer-readable volatile or non-volatile medium storing one or more sequences of instructions which, when executed by one or more processors, causes the one or more processors to perform the method recited in claim 12.

26. A computer-readable volatile or non-volatile medium storing one or more sequences of instructions which, when executed by one or more processors, causes the one or more processors to perform the method recited in claim 13.

27. A computer-implemented method for responding to changes to properties of component instances, the method comprising:

instantiating an instance of a component that has a plurality of properties and a function for registering routines to be informed when properties of the component change;

receiving one or more calls that invoke the function of the instance of the component, wherein the one or more calls specify:

(a) one or more properties of the plurality of properties; and (b) one or more pointers to one or more routines that are to be informed when the one or more properties change;

in response to the one or more calls, the function registering a plurality of routines, wherein:

each routine of the plurality of routines is associated with a corresponding property of the plurality of properties of the instance of the component, wherein the component is a module of code for performing one or more tasks within a software application; and each routine of the plurality of routines is to be informed of changes that occur to the corresponding property of the plurality of properties;

when the value of a particular property of the one or more properties changes, detecting that the value of the particular property has changed; and in response to detecting that the value of the particular property has changed, using a particular pointer of the one or more pointers to make a call to a particular routine, of the one or more routines, to indicate to the particular routine that the particular property has changed.

28. A computer-implemented method for responding to changes to properties of component instances, the method comprising:

registering a plurality of routines, wherein:

each routine of the plurality of routines is associated with a corresponding property of a plurality of properties of an instance of a component, wherein the component is a module of code for performing one or more tasks within a software application; and each routine of the plurality of routines is to be informed of changes that occur to the corresponding property of the plurality of properties;

detecting that the value of a particular property of the plurality of properties has changed;

determining that a first change in a series of recursive changes has caused the detected change to the value of the particular property, wherein:

the series of recursive changes include changes to the values of two or more properties of the plurality of properties;

the first change is a change to the value of a first property of the plurality of properties; and the first property is different than the particular property;

performing each change in the series of recursive changes by recursively modifying the values of the two or more properties of the plurality of properties; and after all changes in the series of recursive changes have been made, making a call to a particular routine of the plurality of routines that is associated with the particular property to indicate that the particular property has changed.

29. The method of claim 28, wherein:

the particular routine of the plurality of routines is associated with a user interface that reflects the value of the particular property; and the method further comprises:

in response to making the call to the particular routine, at the user interface, receiving a notification that the value of the particular property has changed; and updating the user interface to reflect the changed value of the particular property.

30. A computer-readable volatile or non-volatile medium storing one or more sequences of instructions which, when executed by one or more processors, causes the one or more processors to perform the method recited in claim 27.

31. A computer-readable volatile or non-volatile medium storing one or more sequences of instructions which, when executed by one or more processors, causes the one or more processors to perform the method recited in claim 28.

32. A computer-readable volatile or non-volatile medium storing one or more sequences of instructions which, when executed by one or more processors, causes the one or more processors to perform the method recited in claim 29.

* * * * *